(12) United States Patent
Okuhata

(10) Patent No.: US 8,374,287 B2
(45) Date of Patent: Feb. 12, 2013

(54) FM DETECTOR, SIGNAL INTERPOLATION METHOD, AND RELATED PROGRAM

(75) Inventor: Yasuhide Okuhata, Kanagawa-ken (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 267 days.

(21) Appl. No.: 12/926,310

(22) Filed: Nov. 9, 2010

(65) Prior Publication Data

US 2011/0129036 A1 Jun. 2, 2011

(30) Foreign Application Priority Data

Nov. 30, 2009 (JP) ................................. 2009-271655
Oct. 15, 2010 (JP) ................................. 2010-232151

(51) Int. Cl.
*H04L 27/00* (2006.01)
(52) U.S. Cl. ...................................................... 375/316
(58) Field of Classification Search .................. 375/316, 375/322, 324; 329/315, 318, 320
See application file for complete search history.

(56) References Cited

U.S. PATENT DOCUMENTS

| 4,862,099 | A | * | 8/1989 | Nakai et al. | 329/318 |
| 5,128,966 | A | * | 7/1992 | Bang | 375/328 |
| 5,604,503 | A | * | 2/1997 | Fowler et al. | 342/378 |
| 7,024,169 | B2 | * | 4/2006 | Ciccarelli et al. | 455/232.1 |
| 7,072,420 | B2 | * | 7/2006 | Persson | 375/297 |
| 7,956,694 | B1 | * | 6/2011 | Wilson | 331/12 |

FOREIGN PATENT DOCUMENTS

JP 6-71210 9/1994

* cited by examiner

*Primary Examiner* — Khanh C Tran
(74) *Attorney, Agent, or Firm* — Louis Woo

(57) ABSTRACT

A received FM wave signal is subjected to quadrature detection to generate baseband I and Q signals. The baseband I and Q signals are converted into a sequence of samples of phase information. An FM-detection-result signal is generated in response to a variation between two successive samples of the phase information. A power of the baseband I and Q signals is computed. A decision is made as to whether the baseband I and Q signals are valid or invalid by referring to the computed power and at least one threshold value. Signal interpolation is implemented with respect to the FM-detection-result signal in cases where it is decided that the baseband I and Q signals are invalid.

10 Claims, 10 Drawing Sheets

| C1 | — | — | — | — | A0 | A1 | A2 | A3 |
| --- | --- | --- | --- | --- | --- | --- | --- | --- |
| C2 | — | — | — | A0 | A1 | A2 | A3 | A4 |
| C3 | — | — | A0 | A1 | A2 | A3 | A4 | A5 |
| C4 | — | A0 | A1 | A2 | A3 | A4 | A5 | A6 |
| C5 | A0 | A1 | A2 | A3 | A4 | A5 | A6 | A7 |
| D | — | B0 | B1 | B2 | B3 | B4 | B5 | B6 |

FM DETECTOR, SIGNAL INTERPOLATION METHOD, AND RELATED PROGRAM

BACKGROUND OF THE INVENTION

1. Field of the Invention

This invention relates to an FM detector, a signal interpolation method, and a computer program for the FM detector or the signal interpolation method.

2. Description of the Related Art

Japanese examined patent application publication number 6-71210 discloses a device for eliminating pulse noise in an FM receiver. In the device of Japanese publication number 6-71210, a front end converts an RF signal into an IF signal fed to an FM detection circuit and an AM detection circuit. The FM detection circuit is followed by an HPF-containing circuit for sensing the leading edge of every pulse noise in an output signal from the FM detection circuit, that is, the leading edge of every FM or PM pulse noise. The AM detection circuit is followed by an HPF-containing circuit for sensing the leading edge of every pulse noise in an output signal from the AM detection circuit, that is, the leading edge of every AM pulse noise.

In the device of Japanese publication number 6-71210, a gate circuit is connected between the FM detection circuit and a stereo demodulation circuit to selectively allow and block the transmission of the output signal of the FM detection circuit to the stereo demodulation circuit. A level hold circuit is provided between the gate circuit and the stereo demodulation circuit. In the event that the leading edge of an FM, PM, or AM pulse noise is sensed, the gate circuit is closed for a fixed time during which the level hold circuit continues to feed the stereo demodulation circuit with the output signal of the FM detection circuit which occurs immediately before the gate circuit is closed instead of the current output signal of the FM detection circuit. Thus, signal interpolation is implemented with respect to the output signal of the FM detection circuit while the gate circuit is closed. Specifically, the gate circuit is driven by a prescribed-width pulse outputted from a one-shot multivibrator triggered upon the sensing of the leading edge of the pulse noise.

The device of Japanese publication number 6-71210 has drawbacks mentioned below. The closing of the gate circuit or the signal interpolation is carried out independent of the duration of a pulse noise. Accordingly, there is a possibility that the closing of the gate circuit or the signal interpolation will be carried out during a time excessively longer than the duration of a pulse noise.

In the device of Japanese publication number 6-71210, the signal interpolation is implemented by merely using the output signal of the FM detection circuit which occurs immediately before the gate circuit is closed instead of the current output signal of the FM detection circuit. The signal interpolation of this type tends to cause a significant signal distortion.

SUMMARY OF THE INVENTION

It is a first object of this invention to provide an FM detector which implements signal interpolation in response to the detection of a noise for a time as short as possible, and thereby minimizes a signal distortion caused by the implementation of the signal interpolation.

It is a second object of this invention to provide a method of implementing signal interpolation in response to the detection of a noise for a time as short as possible, and thereby minimizing a signal distortion caused by the implementation of the signal interpolation.

It is a third object of this invention to provide a computer program for implementing signal interpolation in FM detection in response to the detection of a noise for a time as short as possible, and thereby minimizing a signal distortion caused by the implementation of the signal interpolation.

A first aspect of this invention provides an FM detector comprising a quadrature detector for subjecting a received FM wave signal to quadrature detection to generate baseband I and Q signals; a phase converter for converting the baseband I and Q signals generated by the quadrature detector into a sequence of samples of phase information; a detection-result signal generator for generating an FM-detection-result signal in response to a variation between two successive samples of the phase information generated by the phase converter; a power calculator for computing a power of the baseband I and Q signals generated by the quadrature detector; a threshold-based decider for deciding whether the baseband I and Q signals are valid or invalid by referring to the power computed by the power calculator and at least one threshold value; and a signal interpolator for implementing signal interpolation with respect to the FM-detection-result signal generated by the detection-result signal generator in cases where the threshold-based decider decides that the baseband I and Q signals are invalid.

A second aspect of this invention is based on the first aspect thereof, and provides an FM detector wherein the threshold-based decider determines whether or not the power computed by the power calculator is in a range between two different threshold values, and decides that the baseband I and Q signals are invalid when determining that the power is not in the range.

A third aspect of this invention is based on the first aspect thereof, and provides an FM detector wherein the threshold-based decider determines whether or not the power computed by the power calculator is lower than the threshold value, and decides that the baseband I and Q signals are invalid when determining that the power is lower than the threshold value.

A fourth aspect of this invention is based on the first aspect thereof, and provides an FM detector wherein the threshold-based decider determines whether or not the power computed by the power calculator is higher than the threshold value, and decides that the baseband I and Q signals are invalid when determining that the power is higher than the threshold value.

A fifth aspect of this invention is based on the first aspect thereof, and provides an FM detector wherein the threshold-based decider calculates an average of the power computed by the power calculator, and varies the threshold value in accordance with the calculated average.

A sixth aspect of this invention is based on the first aspect thereof, and provides an FM detector wherein the signal interpolator implements the signal interpolation by using the FM-detection-result signal originating from the baseband I and Q signals decided to be valid by the threshold-based decider which are the last ones preceding the baseband I and Q signals decided to be invalid by the threshold-based decider.

A seventh aspect of this invention is based on the first aspect thereof, and provides an FM detector wherein the interpolation implemented by the signal interpolator is linear interpolation, and the signal interpolator implements the linear interpolation by using the FM-detection-result signal originating from the baseband I and Q signals decided to be valid by the threshold-based decider which are the last ones preceding the baseband I and Q signals decided to be invalid by the threshold-based decider and the FM-detection-result signal originating from the baseband I and Q signals decided to be valid by the threshold-based decider which are the first ones following the baseband I and Q signals decided to be invalid by the threshold-based decider.

An eighth aspect of this invention provides a method of signal interpolation which comprises the steps of subjecting a received FM broadcast signal to quadrature detection to generate baseband I and Q signals; converting the baseband I and Q signals into a sequence of samples of phase information; generating an FM-detection-result signal in response to a variation between two successive samples of the phase information; computing a power of the baseband I and Q signals; deciding whether the baseband I and Q signals are valid or invalid by referring to the computed power and at least one threshold value; and implementing signal interpolation with respect to the FM-detection-result signal in cases where it is decided that the baseband I and Q signals are invalid.

A ninth aspect of this invention provides an apparatus comprising a quadrature detection unit configured to subject a received FM wave signal to quadrature detection to generate baseband I and Q signals; a phase converting unit configured to convert the baseband I and Q signals into a sequence of samples of phase information; a detection-result signal generating unit configured to generate an FM-detection-result signal in response to a variation between two successive samples of the phase information; a power calculating unit configured to compute a power of the baseband I and Q signals; a threshold-based deciding unit configured to decide whether the baseband I and Q signals are valid or invalid by referring to the power computed by the power calculating unit and at least one threshold value; and a signal interpolation unit configured to implement signal interpolation with respect to the FM-detection-result signal in cases where the threshold-based deciding unit decides that the baseband I and Q signals are invalid.

A tenth aspect of this invention is based on the first aspect thereof, and provides an FM detector wherein the threshold value is predetermined.

This invention has the following advantages. It is possible to decide whether signal interpolation is necessary or unnecessary on the basis of noise. Furthermore, it is possible to reduce or minimizes a distortion of an FM-detection-result signal which is caused by noise.

DETAILED DESCRIPTION OF THE INVENTION

A prior-art device will be explained below for a better understanding of this invention.

Figure 12:
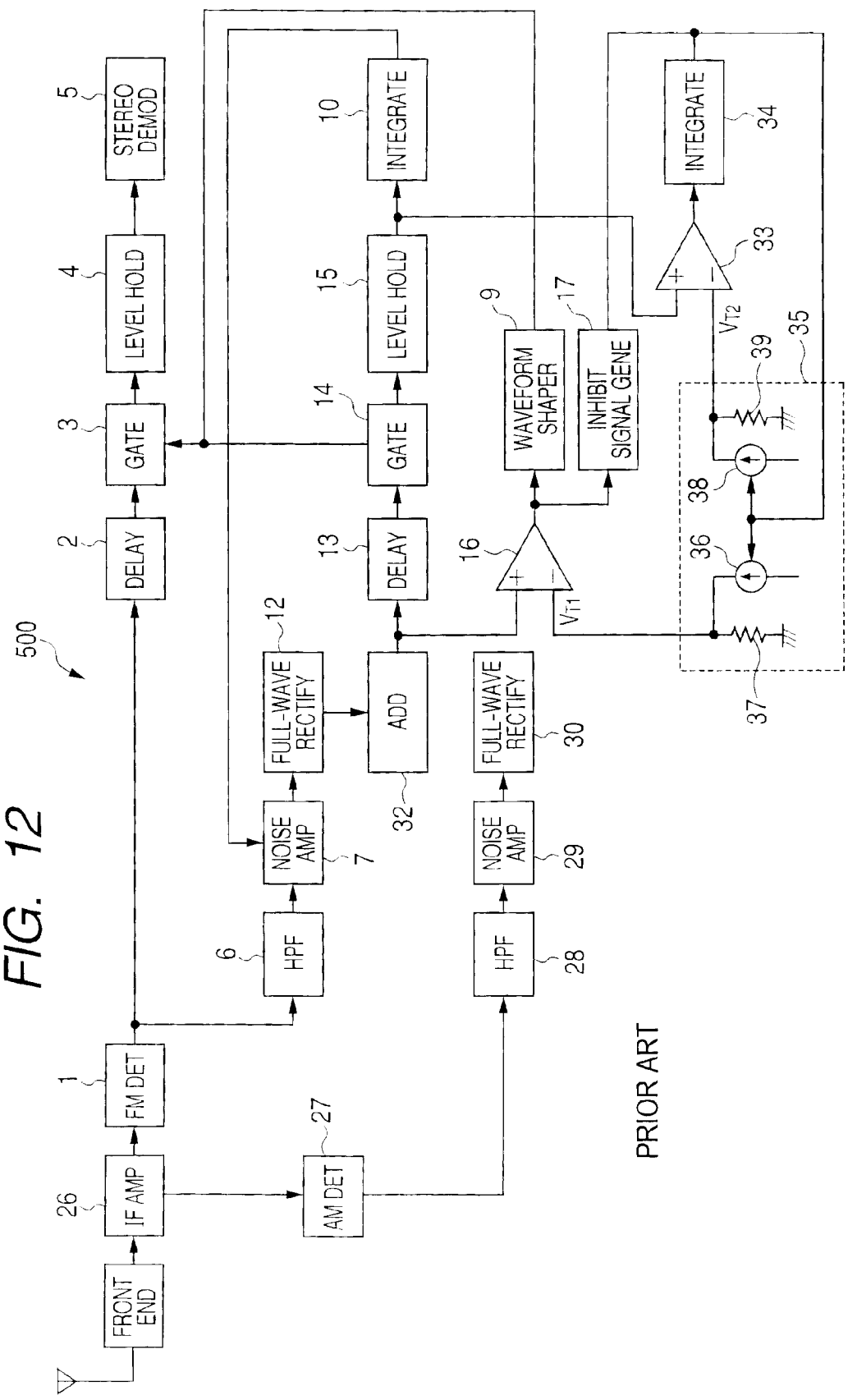
FIG. 12 is a block diagram of a prior-art FM detector.

FIG. 12 shows a prior-art FM (frequency modulation) detector 500 disclosed in Japanese examined patent application publication number 6-71210.

In the prior-art FM detector 500, an FM-detection-result signal outputted from an FM detection circuit 1 is delayed by a delay circuit 2 including an LPF (a low pass filter). The delayed FM-detection-result signal is fed from the delay circuit 2 to a stereo demodulation circuit 5 via a gate circuit 3 and a level hold circuit 4.

The FM-detection-result signal is fed from the FM detection circuit 1 to an HPF (a high pass filter) 6. Noise-related signal components pass through the HPF 6 before being amplified by a noise amplifier 7. A full-wave rectification circuit 12 following the noise amplifier 7 makes the polarity of an output signal from the noise amplifier 7 into one direction.

The prior-art FM detector 500 includes an AM (amplitude modulation) detection circuit 27 receiving an IF (intermediate frequency) signal from an IF amplifier circuit 26. The AM detection circuit 27 subjects the IF signal to AM detection. The output side of the AM detection circuit 27 is successively followed by an HPF 28, a noise amplifier 29, and a full-wave rectification circuit 30. Output signals from the full-wave rectification circuits 12 and 30 are added into an addition-result signal by an addition circuit 32. The addition-result signal is delayed by a delay circuit 13 before being applied to a gate circuit 14 followed by a level hold circuit 15. An output signal from the level hold circuit 15 is fed to an integration circuit 10 as a noise-detection-result signal. The integration circuit 10 smoothes the noise-detection-result signal to generate a direct-current signal depending on the detected noise level. The direct-current signal is fed back to the noise amplifier 7 as a gain control signal for the noise amplifier 7 to form an AGC (automatic gain control) loop.

A comparison circuit 33 is connected to the output side of the level hold circuit 15. The comparison circuit 33 compares the output signal of the level hold circuit 15 with a reference voltage VT2. The comparison circuit 33 is followed by an integration circuit 34. An output signal from the integration circuit 34 is fed to a reference-voltage generation circuit 35 composed of first and second I-V (current-voltage) converters. The first I-V converter, which includes a current source 36 and a resistor 37, generates a reference voltage VT1 for a comparison circuit 16. The second I-V converter, which includes a current source 38 and a resistor 39, generates the reference voltage VT2 for the comparison circuit 33. Currents caused by the current sources 36 and 38 depend on the output signal (the direct-current signal) from the integration circuit 34 so that the voltages across the resistors 37 and 39, that is, the reference voltages VT1 and VT2, vary in accordance with the output signal from the integration circuit 34.

The comparison circuit 16 compares the output signal (the addition-result signal) from the addition circuit 32 with the reference voltage VT1 to generate a comparison-result signal. The comparison circuit 16 feeds the comparison-result signal to a waveform shaping circuit 9 as a noise-detection-result signal. The waveform shaping circuit 9 includes, for example, a one-shot multivibrator, and converts the noise-detection-result signal indicative of a detected noise into a pulse having a prescribed height and a prescribed time width. The waveform shaping circuit 9 feeds the pulse to the gate circuits 3 and 14. The pulse drives the gate circuits 3 and 14, and changes them to their signal cut-off states. The output signal of the delay circuit 2 which occurs at a moment immediately before the change of the gate circuit 3 to its signal cut-off state is held by the level hold circuit 4, and continues to be fed from the level hold circuit 4 to the stereo demodulation circuit 5 while the gate circuit 3 is kept in this signal cut-off state. Thereby, a spike caused by an abrupt voltage change is prevented from occurring in the FM-detection-result signal fed to the stereo demodulation circuit 5.

The output side of the comparison circuit 16 is connected to an inhibition-signal generation circuit 17. A one-shot multivibrator included in the inhibition-signal generation circuit 17 generates a rectangular pulse as an inhibition signal in response to every falling edge in the output signal of the comparison circuit 16. The inhibition-signal generation circuit 17 applies the inhibition signal to the output line from the integration circuit 34 which extends to the reference-voltage generation circuit 35.

In the prior-art FM detector 500, the HPF 6, the noise amplifier 7, and the full-wave rectification circuit 12 cooperate to detect every pulse noise in the FM-detection-result signal outputted from the FM detection circuit 1. The AM detection circuit 27, the HPF 28, the noise amplifier 29, and the full-wave rectification circuit 30 cooperate to detect every pulse noise in the IF signal. In the case where a pulse noise in the FM-detection-result signal or the IF signal is detected, the combination of the gate circuit 3 and the level hold circuit 4 holds the level of the FM-detection-result signal for a fixed time to reduce the pulse noise.

The prior-art FM detector 500 has the previously-mentioned drawbacks that are problems to be solved by this invention.

Figure 1:
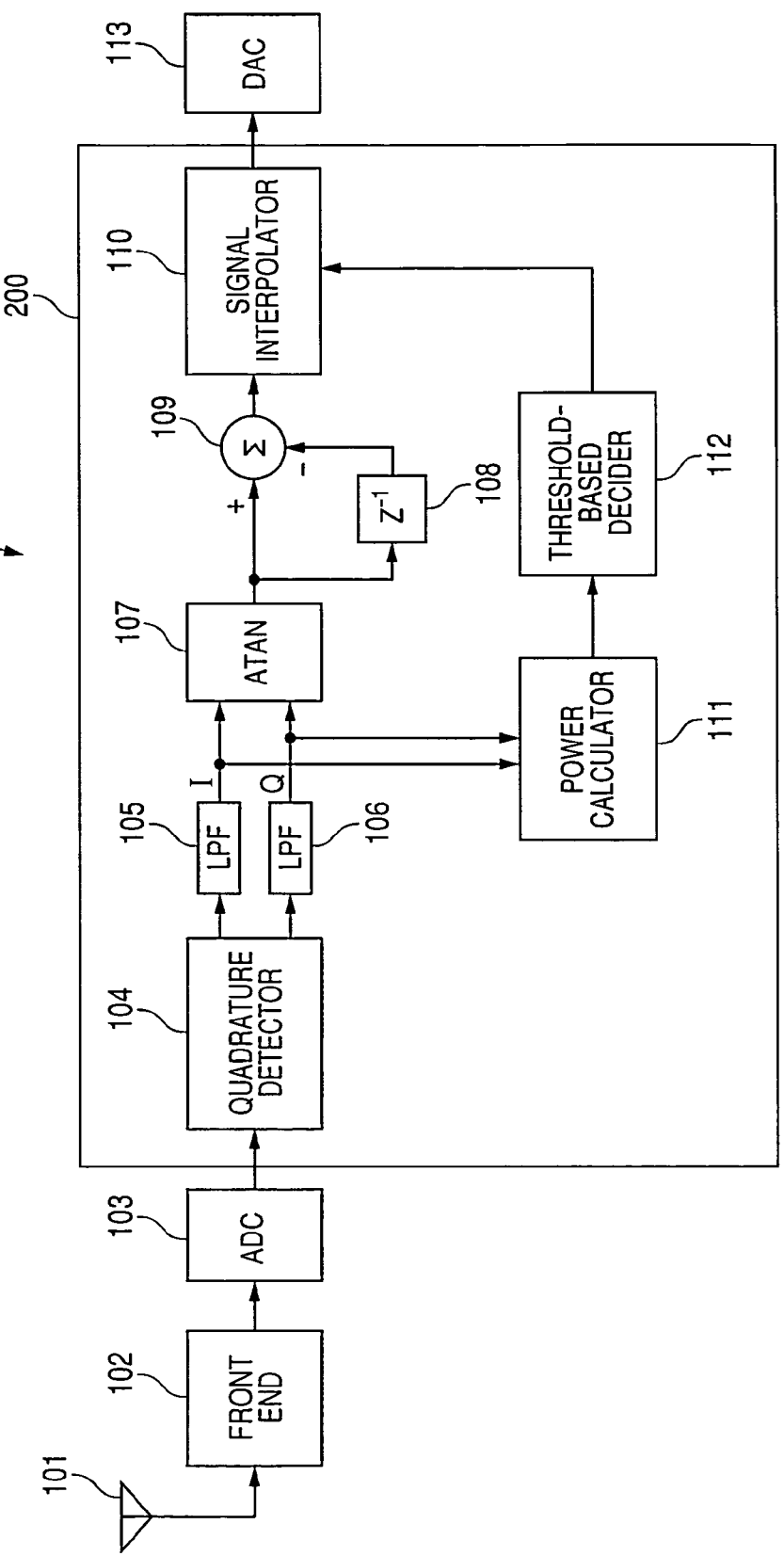
FIG. 1 is a block diagram of an FM detector according to an embodiment of this invention.

FIG. 1 shows an FM detector 100 according to an embodiment of this invention. The FM detector 100 has an antenna 101 and various units including a front end 102, an ADC (analog-to-digital converter) 103, a quadrature detector (quadrature FM detector) 104, LPFs (low pass filters) 105 and 106, an ATAN (arc tangent calculator) 107, a signal delay section 108, a subtracter 109, a signal interpolator 110, a power calculator 111, a threshold-based decider 112, and a DAC (digital-to-analog converter) 113.

The antenna 101 catches an FM radio wave transmitted from an FM radio station. The caught FM radio wave is fed from the antenna 101 to the front end 102 as an RF (radio frequency) FM signal.

The front end 102 subjects the RF FM signal to amplification, frequency conversion, and bandwidth throttling to convert the RF FM signal into an IF (intermediate frequency) FM signal. The front end 102 outputs the IF FM signal to the ADC 103. The ADC 103 converts the IF FM signal into a corresponding digital signal (a sequence of digital samples). Specifically, the ADC 103 periodically samples the IF FM signal at a prescribed sampling frequency, and converts every resultant sample of the IF FM signal into a corresponding digital sample. Thus, the ADC 103 generates a sequence of digital samples (a digital signal). The ADC 103 feeds the digital signal to the quadrature detector 104.

The quadrature detector 104 subjects the digital signal to quadrature detection (quadrature FM detection), and thereby generates a pair of detection-result signals, that is, a baseband I (in-phase) signal and a baseband Q (quadrature) signal. The quadrature detector 104 feeds the baseband I and Q signals to the LPFs 105 and 106, respectively.

The LPF 105 throttles the bandwidth of the baseband I signal by removing, from the baseband I signal, components having frequencies equal to or higher than a prescribed cutoff frequency. Thereby, the LPF 105 generates a bandwidth-throttled baseband I signal. The LPF 105 feeds the bandwidth-throttled baseband I signal to the ATAN 107 and the power calculator 111. Similarly, the LPF 106 throttles the bandwidth of the baseband Q signal by removing, from the baseband Q signal, components having frequencies equal to or higher than the prescribed cutoff frequency. Thereby, the LPF 106 generates a bandwidth-throttled baseband Q signal. The LPF 106 feeds the bandwidth-throttled baseband Q signal to the ATAN 107 and the power calculator 111.

The ATAN 107 converts the bandwidth-throttled baseband I signal and the bandwidth-throttled baseband Q signal into phase information. The ATAN 107 outputs the phase information to the signal delay section 108 and the subtracter 109. Specifically, for every sampling period, the ATAN 107 outputs a sample of the phase information to the signal delay section 108 and the subtracter 109.

The signal delay section 108 delays the phase information by a time interval corresponding to one sample to generate the 1-sample-delayed phase information. The signal delay section 108 outputs the 1-sample-delayed phase information to the subtracter 109.

The subtracter 109 subtracts the 1-sample-delayed phase information from the phase information currently outputted by the ATAN 107 to generate differential phase information. The subtracter 109 feeds the differential phase information to the signal interpolator 110 as an FM-detection-result signal. In the case where the phase information outputted by the ATAN 107 and the 1-sample-delayed phase information outputted by the signal delay section 108 are denoted by P(t) and P(t−1) respectively, the FM-detection-result signal A(t) is expressed by the following equation.

$$A(t)=P(t)-P(t-1) \quad (1)$$

where "t" denotes the current sample (or the current sample timing), and "t−1" denotes the sample (or the sample timing) immediately preceding the current sample (or the current sample timing).

The power calculator 111 computes the power B of the bandwidth-throttled baseband I signal and the bandwidth-throttled baseband Q signal according to the following equation.

$$B=I^2+Q^2 \quad (2)$$

where I and Q denote the bandwidth-throttled baseband I signal and the bandwidth-throttled baseband Q signal respectively. The power calculator 111 notifies the computed power B to the threshold-based decider 112.

The threshold-based decider 112 decides whether or not the bandwidth-throttled baseband I and Q signals are exposed to interference such as pulse-noise interference on the basis of the notified power B. Specifically, the threshold-based decider 112 compares the power B with threshold values "a" and "b". The threshold value "a" is smaller than the threshold value "b". Preferably, the threshold values "a" and "b" are predetermined. Alternatively, the threshold values "a" and "b" may be variable or adjustable. When the power B is lower than the threshold value "a" or higher than the threshold value "b", that is, when the power B is outside the range between the threshold values "a" and "b", the threshold-based decider 112 concludes that the bandwidth-throttled baseband I and Q signals are exposed to interference. The range between the threshold values "a" and "b" is referred to as the normal range. When the power B is in the normal range, the threshold-based decider 112 concludes that the bandwidth-throttled baseband I and Q signals are free from interference. When it is concluded that the bandwidth-throttled baseband I and Q signals are exposed to interference, the threshold-based decider 112 feeds the signal interpolator 110 with a decision-result signal indicating that the current samples of the bandwidth-throttled baseband I and Q signals are invalid (sample invalidness). On the other hand, when it is concluded that the bandwidth-throttled baseband I and Q signals are free from interference, the threshold-based decider 112 feeds the signal interpolator 110 with a decision-result signal indicating that the current samples of the bandwidth-throttled baseband I and Q signals are valid (sample validness).

In the event that the decision-result signal fed from the threshold-based decider 112 indicates sample invalidness, the signal interpolator 110 implements hold-type signal interpolation with respect to each sample of the FM-detection-result signal generated from two successive samples of the phase information which contain at least one sample corresponding to the invalid samples of the bandwidth-throttled baseband I and Q signals. Specifically, the signal interpolator 110 uses a sample of the FM-detection-result signal occurring immediately before the decision-result signal becomes indicative of sample invalidness instead of each sample of the FM-detection-result signal generated from two successive samples of the phase information which contain at least one sample corresponding to the invalid samples of the bandwidth-throttled baseband I and Q signals. Thereby, the signal interpolator 110 generates the interpolated FM-detection-result signal. The signal interpolator 110 outputs the interpolated FM-detection-result signal to the DAC 113. On the other hand, in the case where the decision-result signal continues to indicate sample validness, the signal interpolator 110 does not implement hold-type signal interpolation and passes the current sample of the FM-detection-result signal to the DAC 113 as it is.

The DAC 113 converts the digital FM-detection-result signal outputted by the signal interpolator 110 into an analog audio signal. The DAC 113 outputs the analog audio signal to an external device (not shown).

As shown in FIG. 1, a signal processor 200 contains the quadrature detector 104, the LPFs 105 and 106, the ATAN 107, the signal delay section 108, the subtracter 109, the signal interpolator 110, the power calculator 111, and the threshold-based decider 112.

It should be noted that the signal processor 200 may be formed by an ASIC (application specific integrated circuit). Alternatively, the signal processor 200 may be implemented by a computer.

Figure 2:
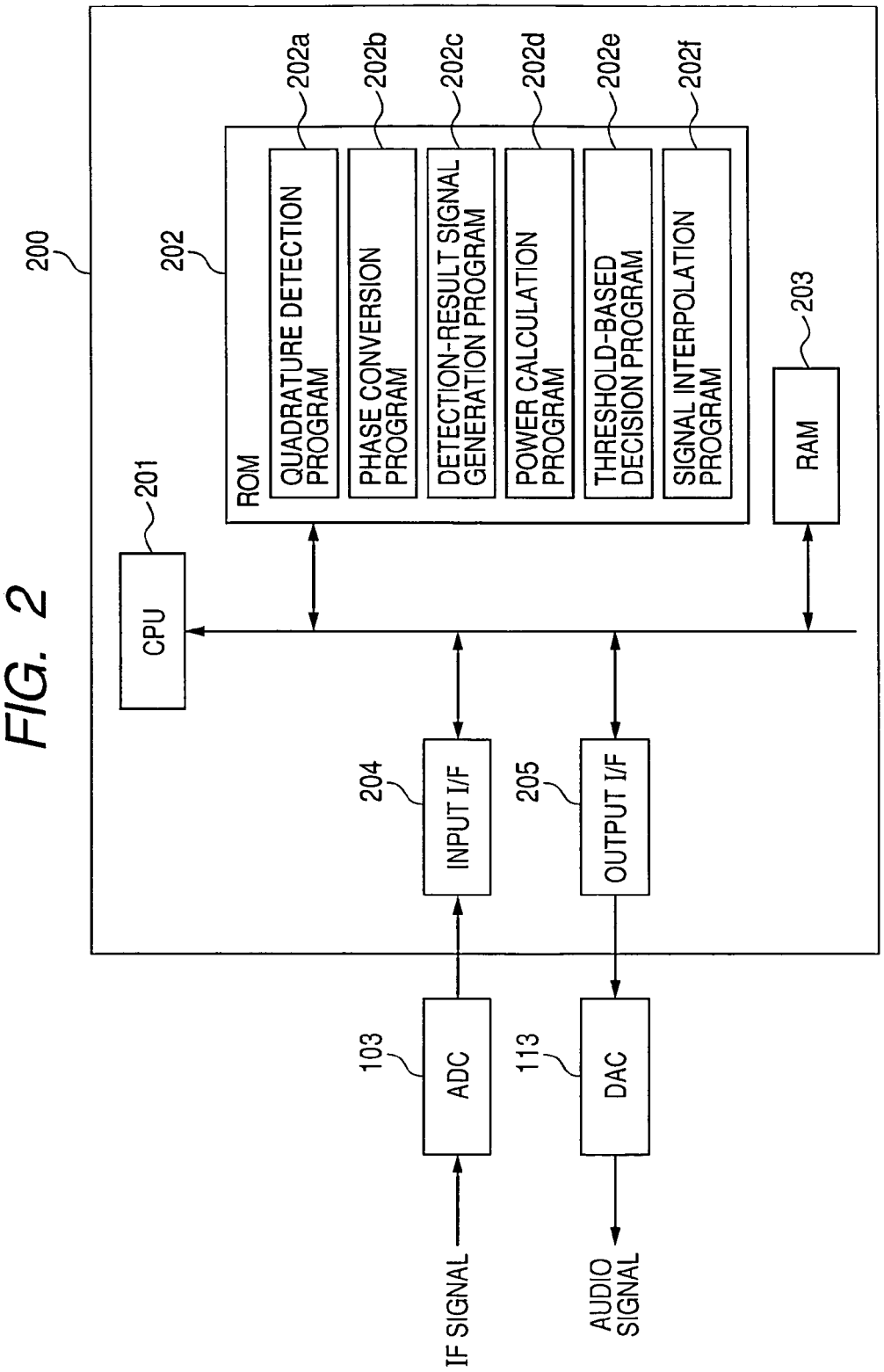
FIG. 2 is a block diagram of a signal processor implemented by a computer.

FIG. 2 shows a structure of the signal processor 200 implemented by a computer. As shown in FIG. 2, the signal processor 200 includes a CPU (central processing unit) 201, a ROM (read-only memory) 202, a RAM (random access memory) 203, an input I/F (interface) 204, and an output I/F 205 connected via a bus to form the computer.

The CPU 201 reads out an overall program (computer program) from the ROM 202, and loads the read-out overall program into the RAM 203. The CPU 201 executes the overall program in the RAM 203, and thereby controls the whole of the signal processor 200 in accordance with the executed overall program. Generally, the CPU 201 controls the ROM 202, the RAM 203, the input I/F 204, and the output I/F 205 in accordance with the executed overall program.

The ROM 202 includes, for example, a semiconductor memory. The ROM 202 prestores the overall program, data, and other signals and information. The overall program in the ROM 202 has segments occupied by a quadrature detection program 202a, a phase conversion program 202b, a detection-result signal generation program 202c, a power calculation program 202d, a threshold-based decision program 202e, and a signal interpolation program 202f designed for implementing the combination of the quadrature detector 104 and the LPFs 105 and 106, the ATAN 107, the combination of the signal delay section 108 and the subtracter 109, the power calculator 111, the threshold-based decider 112, and the signal interpolator 110 respectively.

The RAM 203 stores the overall program in a program store area therein while being controlled by the CPU 201. The RAM 203 has a data store area in addition to the program store area. While the RAM 203 is controlled by the CPU 201, the data store area in the RAM 203 is used to store not only input data but also intermediate data and final data (processing-result data) which are generated during the execution of the overall program.

The input I/F 204 receives the digital signal from the ADC 103. The digital signal received by the input I/F 204 is subjected to various types of processing in accordance with the control by the CPU 201, and is thereby changed into a processing-result digital signal. The processing-result digital signal is fed to the output I/F 205 under the control by the CPU 201. The output I/F 205 outputs the processing-result digital signal to the DAC 113 while being controlled by the CPU 201. The signal processing by the signal processor 200 is on a sample-by-sample basis.

Figure 3:
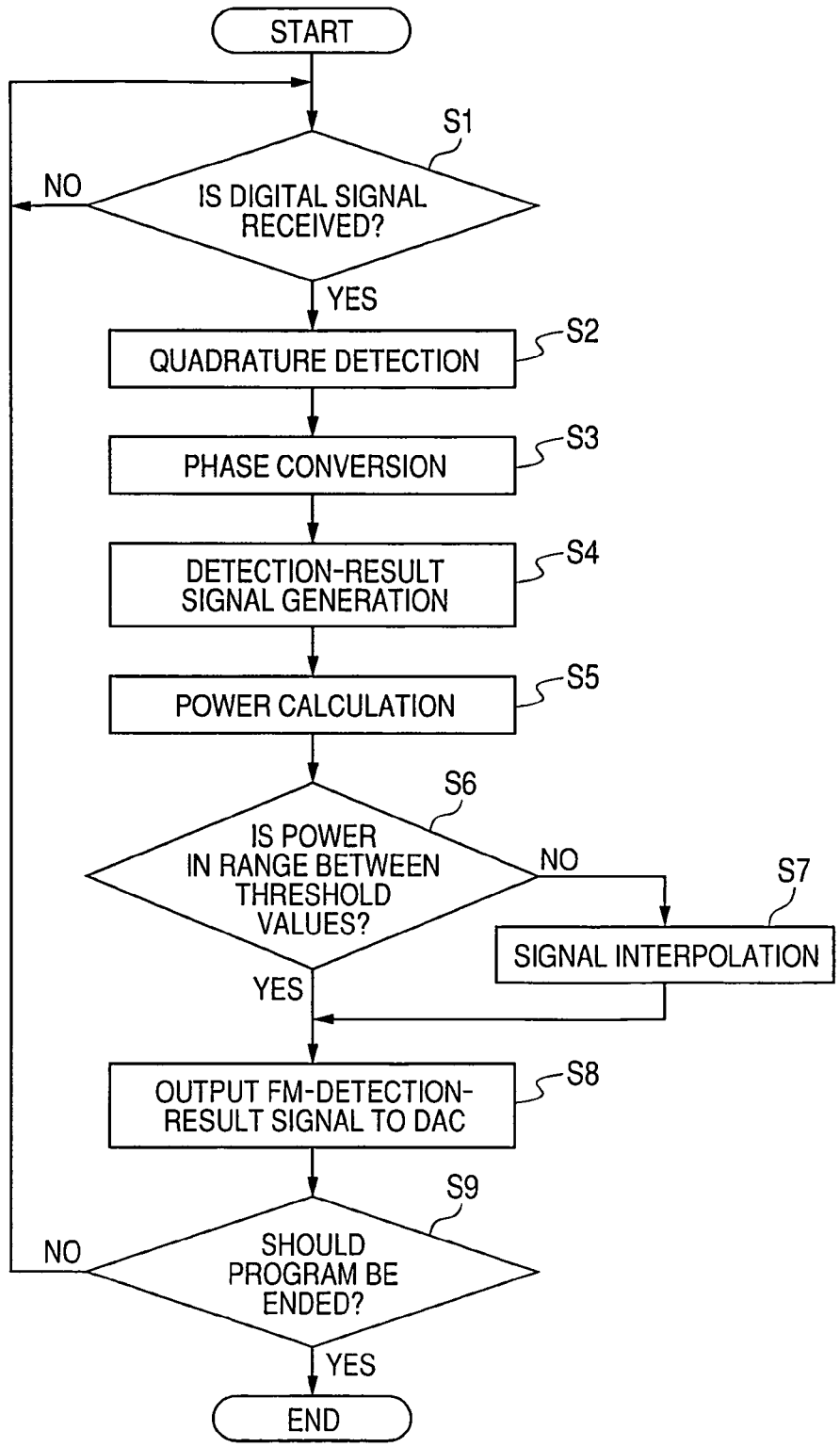
FIG. 3 is a flowchart of an overall program for the computer in FIG. 2.

FIG. 3 is a flowchart of the overall program. As shown in FIG. 3, a first step S1 of the overall program decides whether or not the input I/F 204 receives a new sample of the digital signal from the ADC 103. When the input I/F 204 receives a new sample of the digital signal, the overall program advances from the step S1 to a step S2. Otherwise, the step S1 is repeated to wait for the reception of a new sample of the digital signal.

Generally, a sequence of the step S2 and later steps is carried out for every received sample of the digital signal.

The step S2 executes the quadrature detection program 202a. According to the quadrature detection program 202a, the step S2 subjects the digital signal received by the input I/F 204 to quadrature detection (quadrature FM detection), and thereby generates a pair of detection-result signals, that is, a baseband I (in-phase) signal and a baseband Q (quadrature) signal. In addition, the step S2 throttles the bandwidth of the baseband I signal by removing, from the baseband I signal, components having frequencies equal to or higher than the prescribed cutoff frequency. Thereby, the step S2 generates a new sample of a bandwidth-throttled baseband I signal. Similarly, the step S2 throttles the bandwidth of the baseband Q signal by removing, from the baseband Q signal, components having frequencies equal to or higher than the prescribed cutoff frequency. Thereby, the step S2 generates a new sample of a bandwidth-throttled baseband Q signal. The step S2 corresponds to the quadrature detector 104 and the LPFs 105 and 106 in FIG. 1 as well as their operations. Thus, the step S2 implements the quadrature detector 104 and the LPFs 105 and 106.

A step S3 following the step S2 executes the phase conversion program 202b. According to the phase conversion program 202b, the step S3 converts the new samples of the bandwidth-throttled baseband I and Q signals into a new sample of phase information. The step S3 corresponds to the ATAN 107 in FIG. 1 as well as its operation. Thus, the step S3 implements the ATAN 107.

A step S4 subsequent to the step S3 executes the detection-result signal generation program 202c. According to the detection-result signal generation program 202c, the step S4 subtracts the phase information sample immediately preceding the new phase information sample from the new phase information sample to generate a new sample of an FM-detection-result signal. The step S4 corresponds to the signal delay section 108 and the subtracter 109 in FIG. 1 as well as their operations. Thus, the step S4 implements the signal delay section 108 and the subtracter 109.

A step S5 following the step S4 executes the power calculation program 202d. According to the power calculation program 202d, the step S5 computes the power B of the new samples of the bandwidth-throttled baseband I and Q signals. The step S5 corresponds to the power calculator 111 in FIG. 1 as well as its operation. Thus, the step S5 implements the power calculator 111.

A step S6 subsequent to the step S5 executes the threshold-based decision program 202e. According to the threshold-based decision program 202e, the step S6 refers to not only the computed power B of the new samples of the bandwidth-throttled baseband I and Q signals but also the computed power B of the samples thereof which immediately precede the new samples. The step S6 compares each of these computed powers B with the threshold values "a" and "b" to determine whether or not both the computed powers B are in the range between the threshold values "a" and "b" (the normal range). When at least one of the computed powers B is determined to be not in the normal range, the overall program advances from the step S6 to a step S7. On the other hand, when both the computed powers B are determined to be in the normal range, the overall program advances from the step S6 to a step S8. The step S6 corresponds to the threshold-based decider 112 in FIG. 1 as well as its operation. Thus, the step S6 implements the threshold-based decider 112.

It should be noted that the new sample of the FM-detection-result signal is generated from the new and immediately-preceding phase information samples corresponding to the new and immediately-preceding samples of the bandwidth-throttled baseband I and Q signals which are used for computing the powers B. Therefore, when the new and immediately-preceding samples of the bandwidth-throttled baseband I and Q signals contain those decided to be invalid on the basis of the related computed power B, the new sample of the FM-detection-result signal is unreliable and inaccurate.

The step S7 executes the signal interpolation program 202f. According to the signal interpolation program 202f, the step S7 updates the new sample of the FM-detection-result signal through hold-type signal interpolation. Specifically, the new sample of the FM-detection-result signal is discarded, and a sample preceding the new sample and occurring immediately before at least one of the computed powers B is determined to be not in the normal range by the step S6 is used as the new sample. Thereby, the step S7 implements the hold-type signal interpolation with respect to the FM-detection-result signal. After the step S7, the overall program advances to the step S8.

The step S8 outputs the new sample of the FM-detection-result signal to the DAC 113.

When the step S6 determines that both the computed powers B are in the normal range, the overall program advances from the step S6 to the step S8 without passing through the step S7. Thus, in this case, the new sample of the FM-detection-result signal which is generated by the step S4 is outputted to the DAC 113 as it is. On the other hand, in the case where the step S6 determines that at least one of the computed powers B is not in the normal range, the overall program advances from the step S6 to the step S8 via the step S7. Thus, in this case, the sample of the FM-detection-result signal which precedes the new sample and occurs immediately before at least one of the computed powers B is determined to be not in the normal range is outputted to the DAC 113 as the new sample of the FM-detection-result signal.

The steps S7 and S8 correspond to the signal interpolator 110 in FIG. 1 as well as its operation. Thus, the steps S7 and S8 implement the signal interpolator 110.

A step S9 following the step S8 determines whether or not the overall program should be ended. When the overall program should be ended, the overall program exits from the step S9 and then the current execution of the overall program ends. On the other hand, when the overall program should not be ended, the overall program returns from the step S9 to the step S1.

Figure 4:
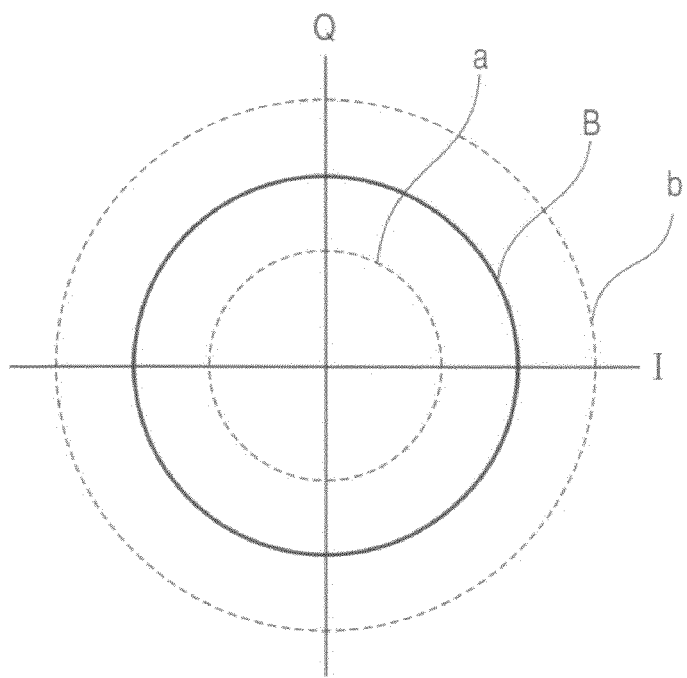
FIG. 4 is a diagram showing a two-dimensional coordinate system defined by baseband I and Q signals in which the solid-line circle denotes a power of signals free from interference.

As shown in FIG. 4, the threshold values "a" and "b" are expressed by smaller and larger circles centered at the origin of the I-Q coordinate system respectively. When the computed power B of the bandwidth-throttled baseband I and Q signals is in the range between the circles of the threshold values "a" and "b" (the normal range), the threshold-based decider 112 concludes that the bandwidth-throttled baseband I and Q signals are free from interference such as pulse-noise interference. Generally, the amplitude of an FM wave is constant. Therefore, as long as the bandwidth-throttled baseband I and Q signals are free from interference, the computed power B moves along a circle centered at the origin of the I-Q coordinate system and positioned between the circles of the threshold values "a" and "b" in accordance with the lapse of time.

Figure 5:
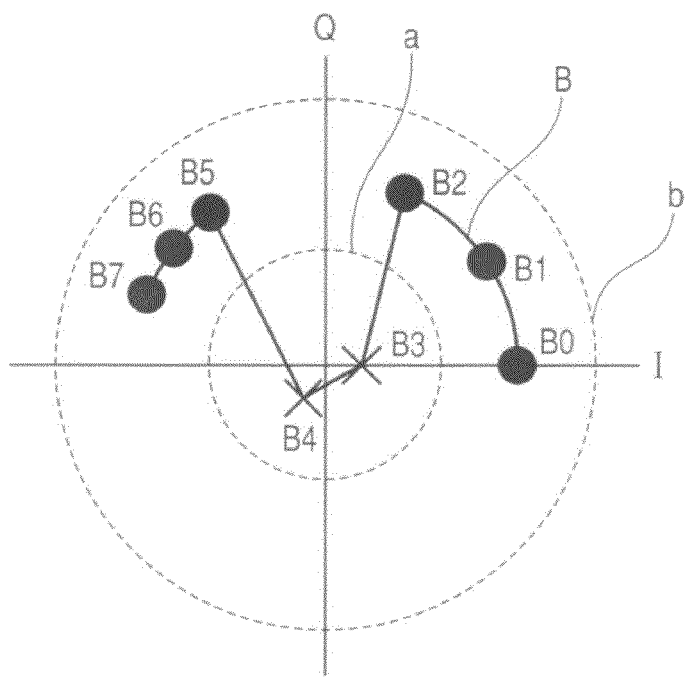
FIG. 5 is a diagram showing a two-dimensional coordinate system defined by baseband I and Q signals in which the dot marks denote powers of signals free from interference and the cross marks denote powers of signals exposed to interference.

With reference to FIG. 5, B0 denotes the computed power of first samples of the bandwidth-throttled baseband I and Q signals, and B1 denotes the computed power of second samples thereof which immediately follow the first samples. Similarly, B2, B3, B4, B5, B6, and B7 denote the computed powers of third, fourth, fifth, sixth, seventh, and eighth samples of the bandwidth-throttled baseband I and Q signals, respectively. The computed powers B0, B1, B2, B5, B6, and B7 are in the normal range (the range between the circles of the threshold values "a" and "b"), whereas the computed powers B3 and B4 are outside the normal range. The computed powers B3 and B4 outside the normal range (the abnormal computed powers B3 and B4) show that the corresponding samples of the bandwidth-throttled baseband I and Q signals are exposed to interference such as pulse-noise interference. The threshold-based decider 112 determines that the samples of the bandwidth-throttled baseband I and Q signals which correspond to the abnormal computed powers B3 and B4 are invalid. In this case, the threshold-based decider 112 feeds the signal interpolator 110 with a decision-result signal indicative of sample invalidness regarding the invalid samples of the bandwidth-throttled baseband I and Q signals.

Figure 6:
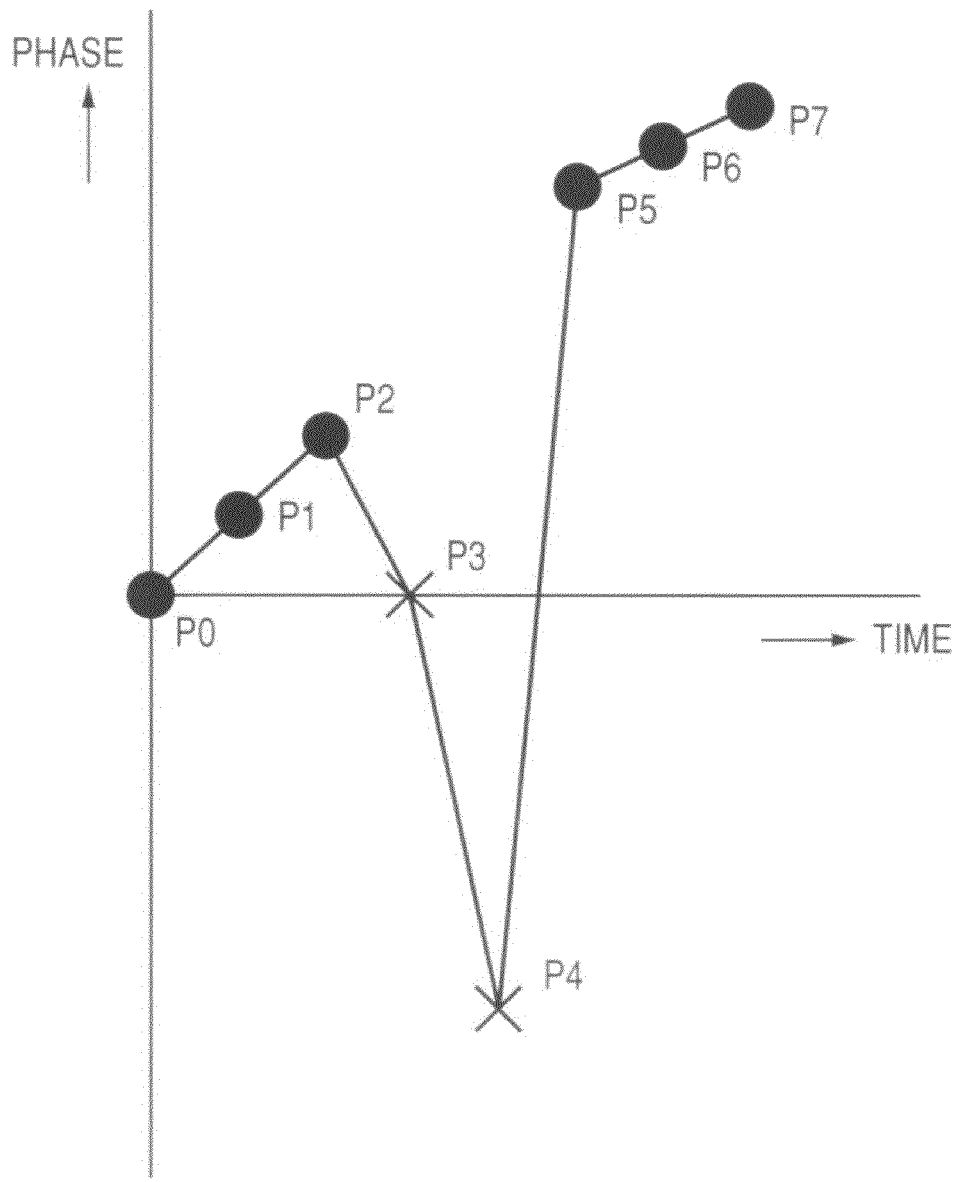
FIG. 6 is a time-domain diagram of phase information originating from baseband I and Q signals temporarily exposed to interference.

FIG. 6 shows successive samples P0-P7 of the phase information which correspond to the computed powers B0-B7 respectively. The phase information samples P0, P1, P2, P5, P6, and P7 are approximately on a common line while the phase information samples P3 and P4 which correspond to the abnormal computed powers B3 and B4 are greatly off from the common line.

Figure 7:
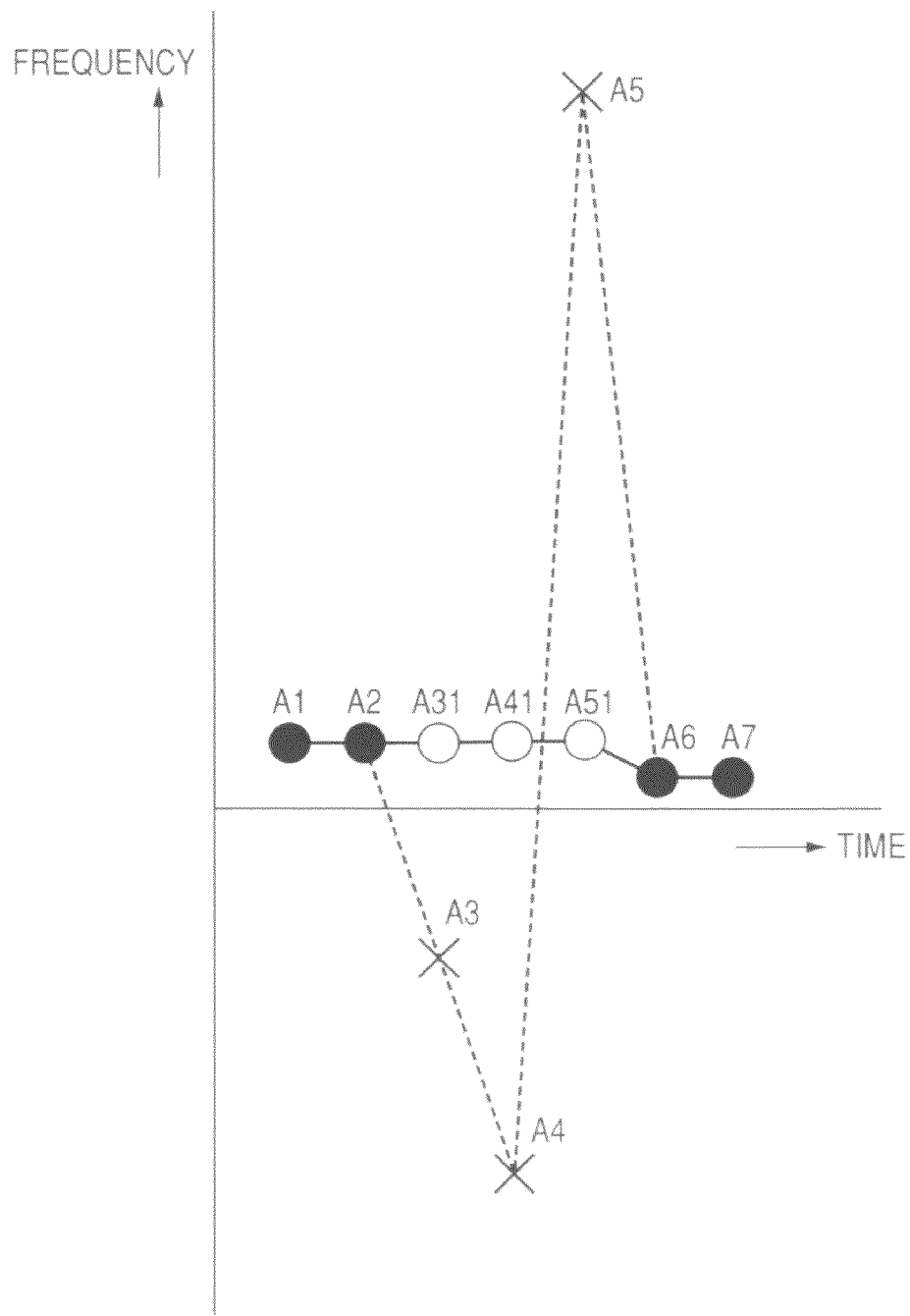
FIG. 7 is a time-domain diagram of an FM-detection-result signal generated from the phase information in FIG. 6.

FIG. 7 shows samples A1-A7 of the FM-detection-result signal which are generated from the phase information samples P0-P7. Specifically, the samples A1, A2, A3, A4, A5, A6, and A7 are given by P1−P0, P2−P1, P3=P2, P4−P3, P5−P4, P6−P5, and P7−P6, respectively.

The phase information samples P3 and P4 correspond to the abnormal computed powers B3 and B4, respectively. Therefore, the samples A3 (=P3−P2), A4 (=P4−P3), and A5 (=P5−P4) of the FM-detection-result signal which depend on the phase information samples P3 and P4 are regarded as invalid ones. As shown in FIG. 7, the invalid samples A3, A4, and A5 are greatly off from a common line on which the valid samples A1, A2, A6, and A7 are arranged.

The valid sample A2 of the FM-detection-result signal occurs immediately before the computed power B3 is determined to be abnormal. The hold-type signal interpolation by the signal interpolator 110 replaces the invalid samples A3, A4, and A5 with substitute samples A31, A41, and A51 respectively which are equal in value to the valid sample A2. In other words, the valid sample A2 immediately preceding the series of the invalid samples A3, A4, and A5 is used instead of each of the invalid samples A3, A4, and A5. Thus, the FM-detection-result signal is held at the value of the valid sample A2 during a term for which the invalid samples A3, A4, and A5 occur. This hold-type signal interpolation prevents the FM-detection-result signal from being distorted by interference such as pulse-noise interference.

In the FM detector 100, the threshold-based decider 112 determines whether the current samples of the bandwidth-throttled baseband I and Q signals are valid or invalid. In the event that the current samples of the bandwidth-throttled baseband I and Q signals are determined to be invalid, the signal interpolator 110 implements the hold-type signal interpolation with respect to the FM-detection-result signal through the use of a sample of the FM-detection-result signal which is generated from two successive phase information samples immediately preceding a sample corresponding to the invalid samples of the bandwidth-throttled baseband I and Q signals.

Figure 8:
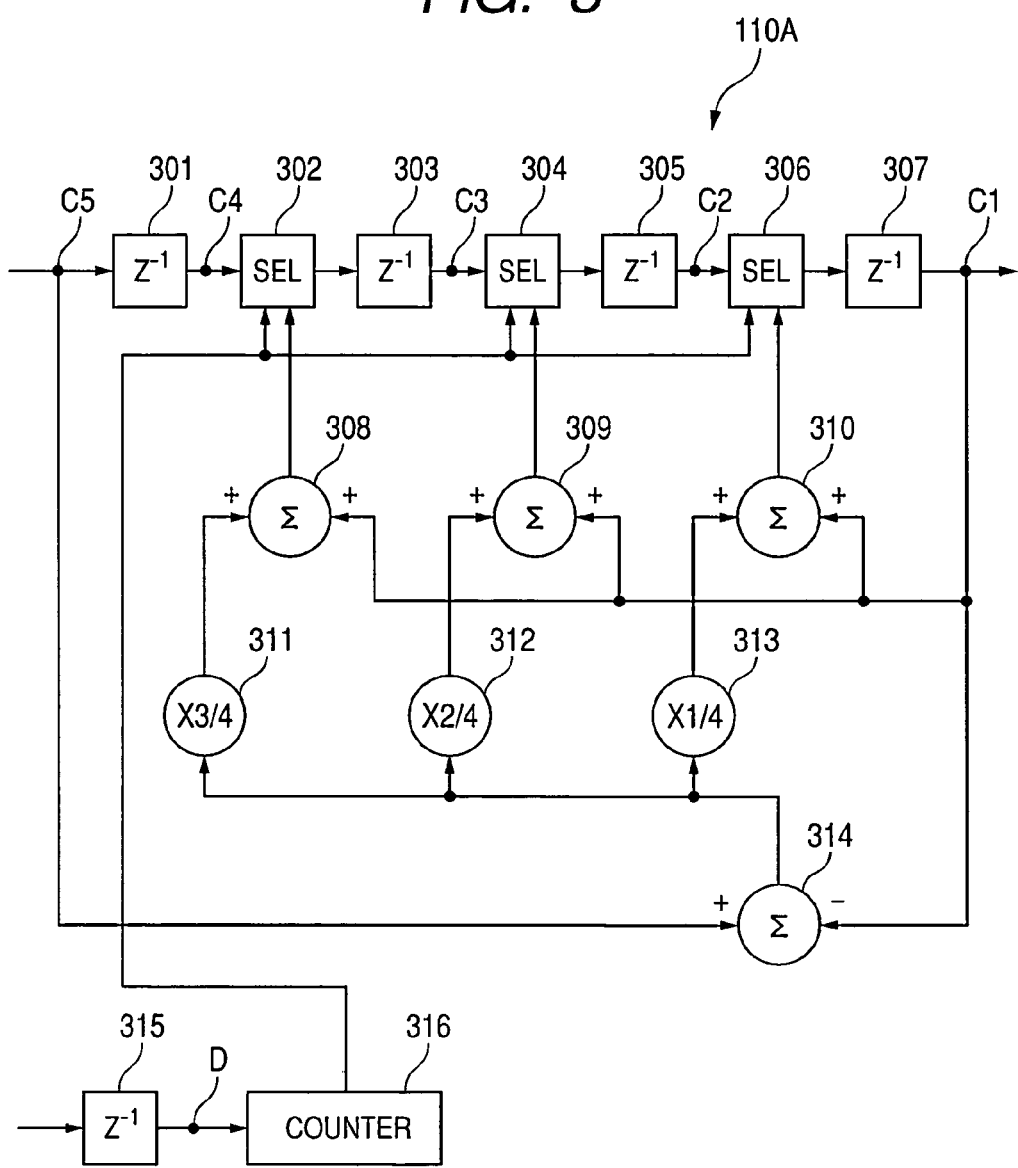
FIG. 8 is a block diagram of a portion of a signal interpolator which may replace a signal interpolator in FIG. 1.

FIG. 8 shows a portion of a signal interpolator 110A which may replace the signal interpolator 110 in FIG. 1. The signal interpolator 110A can implement linear signal interpolation with respect to three successive invalid samples of the FM-detection-result signal. The signal interpolator 110A includes signal delay sections 301, 303, 305, 307, and 315, selectors 302, 304, and 306, adders 308, 309, and 310, signal adjusters 311, 312, and 313, a subtracter 314, and a counter 316.

The signal delay section 315 receives the decision-result signal from the threshold-based decider 112 (see FIG. 1), and delays the decision-result signal by a time interval corresponding to one sample to generate the 1-sample-delayed decision-result signal. The signal delay section 315 feeds the counter 316 with the 1-sample-delayed decision-result signal. The counter 316 counts the number of successive 1-sample periods during which the 1-sample-delayed decision-result signal remains indicative of sample invalidness. In FIG. 8, D denotes a point between the signal delay section 315 and the counter 316 at which the flowing decision-result signal is checked.

The signal delay section 301, the selector 302, the signal delay section 303, the selector 304, the signal delay section 305, the selector 306, and the signal delay section 307 are connected in series in that order. The signal delay section 301 and the subtracter 314 receive the FM-detection-result signal from the subtracter 109 (see FIG. 1). In FIG. 8, C1, C2, C3, and C4 denote points immediately following the signal delay sections 307, 305, 303, and 301 at which the flowing FM-detection-result signal is checked. In addition, C5 denotes a point immediately preceding the signal delay section 301 at which the flowing FM-detection-result signal is checked.

The decision-result signal fed from the threshold-based decider 112 (see FIG. 1) indicates whether the current samples of the bandwidth-throttled baseband I and Q signals are valid or invalid. In the event that the samples of the bandwidth-throttled baseband I and Q signals which correspond to the abnormal computed powers B3 and B4 are determined to be invalid as shown in FIG. 5, the samples A3, A4, and A5 of the FM-detection-result signal which are generated from the phase information samples inclusive of the phase information samples P3 and P4 corresponding to the invalid samples of the bandwidth-throttled baseband I and Q signals are concluded to be invalid also. Thus, the invalid FM-detection-result signal (A3, A4, and A5) remains outputted until a moment 1-sample after the occurrence of the decision-result signal corresponding to the later abnormal computed power B4. The 1-sample delay provided to the decision-result signal by the signal delay section 315 removes a timing difference between the decision-result signal and the FM-detection-result signal.

Figures 9, 10:
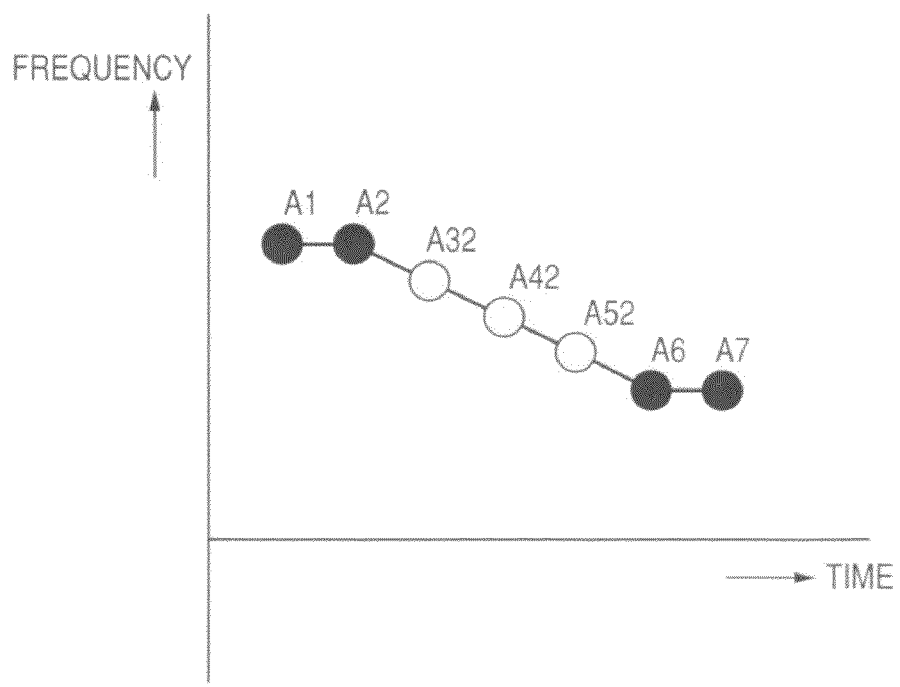
FIG. 9 is a diagram showing the timing relation between an FM-detection-result signal and a decision-result signal occurring at check points in FIG. 8.
FIG. 10 is a time-domain diagram of an FM-detection-result signal which has been subjected to linear signal interpolation by the signal interpolator of FIG. 8.

With reference to FIG. 9, when the decision-result signal corresponding to the computed power B1 is at the point D, the samples A0, A1, and A2 of the FM-detection-result signal are at the points C3, C4, and C5 respectively.

The signal delay section 315 receives the decision-result signal indicative of sample invalidness (corresponding to the abnormal computed powers B3 and B4) for two successive 1-sample periods, and thereafter receives the decision-result signal indicative of sample validness (corresponding to the normal computed power B5). As shown in FIG. 9, when the decision-result signal corresponding to the computed power B5 is at the point D, the samples A2-A6 of the FM-detection-result signal are at the points C1-C5 respectively.

The signal interpolator 110A implements linear signal interpolation with respect to the FM-detection-result signal on the basis of its sample A2 generated from two successive phase information samples immediately preceding the phase information sample corresponding to the former invalid samples of the bandwidth-throttled baseband I and Q signals (corresponding to the abnormal computed power B3) and its sample A6 generated from two successive phase information samples immediately following the phase information sample corresponding to the later invalid samples of the bandwidth-throttled baseband I and Q signals (corresponding to the abnormal computed power B4).

When the decision-result signal corresponding to the computed power B5 is at the point D, the subtracter 314 subtracts the sample A2 from the sample A6 to generate a subtraction result A6−A2. The subtracter 314 notifies the subtraction result A6−A2 to the signal adjusters 311, 312, and 313. The signal adjuster 311 multiplies the subtraction result A6−A2 by ¾ to generate a multiplication result (¾)·(A6−A2). The signal adjuster 311 notifies the multiplication result to the adder 308. The signal adjuster 312 multiplies the subtraction result A6−A2 by 2/4 to generate a multiplication result (2/4)·(A6−A2). The signal adjuster 312 notifies the multiplication result to the adder 309. The signal adjuster 313 multiplies the subtraction result A6−A2 by ¼ to generate a multiplication result (¼)·(A6−A2). The signal adjuster 313 notifies the multiplication result to the adder 310. The adder 308 adds the multiplication result (¾)·(A6−A2) to the sample A2 to generate a substitute sample A52 for the invalid sample A5. The adder 308 notifies the substitute sample A52 to the selector 302. The adder 309 adds the multiplication result (2/4)·(A6−A2) to the sample A2 to generate a substitute sample A42 for the invalid sample A4. The adder 309 notifies the substitute sample A42 to the selector 304. The adder 310 adds the multiplication result (¼)·(A6−A2) to the sample A2 to generate a substitute sample A32 for the invalid sample A3. The adder 310 notifies the substitute sample A32 to the selector 306.

The counter 316 determines whether or not the 1-sample-delayed decision-result signal remains indicative of sample invalidness for two successive 1-sample periods only. The counter 316 generates a control signal for the selectors 302, 304, and 306 in accordance with the result of the determination. When the decision-result signal corresponding to the computed power B5 is at the point D, the counter 316 determines that the 1-sample-delayed decision-result signal remains indicative of sample invalidness for two successive 1-sample periods (corresponding to the abnormal computed powers B3 and B4) only. Accordingly, in this case, the control signal generated by the counter 316 responds to the above determination and hence forces the selector 302 to select the substitute sample A52 rather than the invalid sample A5 outputted from the signal delay section 301. In addition, the control signal forces the selector 304 to select the substitute sample A42 rather than the invalid sample A4 outputted from the signal delay section 303. Furthermore, the control signal forces the selector 306 to select the substitute sample A32 rather than the invalid sample A3 outputted from the signal delay section 305.

Therefore, the signal delay section 307 outputs the series of the samples A2, A32, A42, A52, and A6 instead of the series of the samples A2, A3, A4, A5, and A6 in accordance with the lapse of time. The signal interpolator 110A outputs the series of the samples A2, A32, A42, A52, and A6 to the DAC 113 (see FIG. 1) as a linearly-interpolated FM-detection-result signal.

FIG. 10 shows an example of the series of the samples A2, A32, A42, A52, A6, and A7 of the linearly-interpolated FM-detection-result signal. The linear signal interpolation by the signal interpolator 110A generates the samples A32, A42, A52 which substitute for the invalid samples A3, A4, and A5 respectively. As shown in FIG. 10, the samples A32, A42, A52 are arranged on a straight line connecting the valid samples A2 and A6 immediately preceding and immediately following the series of the invalid samples A3, A4, and A5. The linear signal interpolation by the signal interpolator 110A further prevents the FM-detection-result signal from being distorted by interference such as pulse-noise interference.

Figure 11:
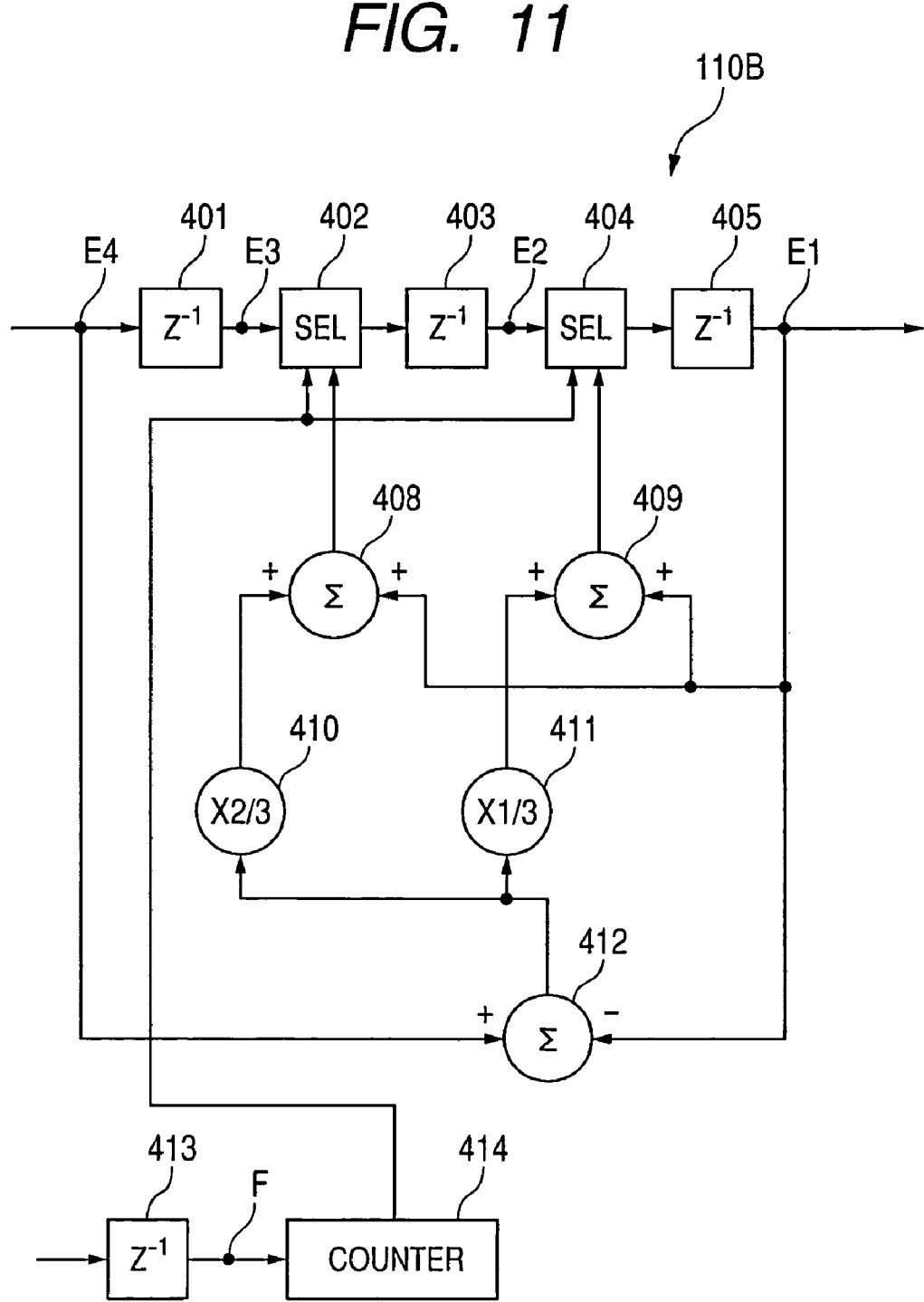
FIG. 11 is a block diagram of a portion of a signal interpolator which may replace the signal interpolator in FIG. 1.

FIG. 11 shows a signal interpolator 110B which may replace the signal interpolator 110 in FIG. 1. The signal interpolator 110B can implement linear signal interpolation with respect to two successive invalid samples of the FM-detection-result signal. The signal interpolator 110B includes signal delay sections 401, 403, 405, and 413, selectors 402 and 404, adders 408 and 409, signal adjusters 410 and 411, a subtracter 412, and a counter 414.

The signal delay section 413 receives the decision-result signal from the threshold-based decider 112 (see FIG. 1), and delays the decision-result signal by a time interval corresponding to one sample to generate the 1-sample-delayed decision-result signal. The signal delay section 413 feeds the counter 414 with the 1-sample-delayed decision-result signal. The counter 414 counts the number of successive 1-sample periods during which the 1-sample-delayed decision-result signal remains indicating sample invalidness. In FIG. 11, F denotes a point between the signal delay section 413 and the counter 414 at which the flowing decision-result signal is checked.

The signal delay section 401, the selector 402, the signal delay section 403, the selector 404, and the signal delay section 405 are connected in series in that order. The signal delay section 401 and the subtracter 412 receive the FM-detection-result signal from the subtracter 109 (see FIG. 1). In FIG. 11, E1, E2, and E3 denote points immediately following the signal delay sections 405, 403, and 401 at which the flowing FM-detection-result signal is checked. In addition, E4 denotes a point immediately preceding the signal delay section 401 at which the flowing FM-detection-result signal is checked.

In the case where the computed powers B7, B8, B9, and B10 are determined to be normal, abnormal, normal, and normal respectively, the samples A7, A8, A9, and A10 of the FM-detection-result signal are concluded to be valid, invalid, invalid, and valid respectively. In this case, the signal interpolator 110B implements linear signal interpolation with respect to the FM-detection-result signal on the basis of its valid samples A7 and A10 immediately preceding and immediately following the series of the invalid samples A8 and A9.

When the samples A7, A8, A9, and A10 of the FM-detection-result signal are at the points E1, E2, E3, and E4 respectively, the subtracter 412 subtracts the sample A7 from the sample A10 to generate a subtraction result A10−A7. The subtracter 412 notifies the subtraction result A10−A7 to the signal adjusters 410 and 411. The signal adjuster 410 multiplies the subtraction result A10−A7 by $2/3$ to generate a multiplication result $(2/3) \cdot (A10-A7)$. The signal adjuster 410 notifies the multiplication result to the adder 408. The signal adjuster 411 multiplies the subtraction result A10−A7 by $1/3$ to generate a multiplication result $(1/3) \cdot (A10-A7)$. The signal adjuster 411 notifies the multiplication result to the adder 409. The adder 408 adds the multiplication result $(2/3) \cdot (A10-A7)$ to the sample A7 to generate a substitute sample A92 for the invalid sample A9. The adder 408 notifies the substitute sample A92 to the selector 402. The adder 409 adds the multiplication result $(1/3) \cdot (A10-A7)$ to the sample A7 to generate a substitute sample A82 for the invalid sample A8. The adder 409 notifies the substitute sample A82 to the selector 404.

The counter 414 determines whether or not the 1-sample-delayed decision-result signal remains indicative of sample invalidness for one 1-sample period only. The counter 414 generates a control signal for the selectors 402 and 404 in accordance with the result of the determination. When the decision-result signal corresponding to the computed power B9 is at the point F, the counter 414 determines that the 1-sample-delayed decision-result signal remains indicative of sample invalidness for one 1-sample period (corresponding to the abnormal computed power B8) only. Accordingly, in this case, the control signal generated by the counter 414 responds to the above determination and hence forces the selector 402 to select the substitute sample A92 rather than the invalid sample A9 outputted from the signal delay section 401. In addition, the control signal forces the selector 404 to select the substitute sample A82 rather than the invalid sample A8 outputted from the signal delay section 403.

Therefore, the signal delay section 405 outputs the series of the samples A7, A82, A92, and A10 instead of the series of the samples A7, A8, A9, and A10 in accordance with the lapse of time. The signal interpolator 110B outputs the series of the samples A7, A82, A92, and A10 to the DAC 113 (see FIG. 1) as a linearly-interpolated FM-detection-result signal.

The samples A82 and A92 are arranged on a straight line connecting the valid samples A7 and A10 immediately preceding and immediately following the series of the invalid samples A8 and A9. The linear signal interpolation by the signal interpolator 110B further prevents the FM-detection-result signal from being distorted by interference such as pulse-noise interference.

The FM detector 100 includes a quadrature detection unit, a phase converting unit, a detection-result signal generating unit, a power calculating unit, a threshold-based deciding unit, and a signal interpolation unit. The quadrature detection unit comprises the quadrature detector 104 and subjects a received FM broadcast signal or a received FM wave signal to quadrature detection to generate baseband I and Q signals. The phase converting unit comprises the ATAN 107 and converts the baseband I and Q signals generated by the quadrature detection unit into a sequence of samples of phase information. The detection-result signal generating unit comprises the subtracter 109 and generates an FM-detection-result signal on the basis of a variation between two successive samples of the phase information generated by the phase converting unit. The power calculating unit comprises the power calculator 111 and computes the power of the baseband I and Q signals generated by the quadrature detection unit. The threshold-based deciding unit comprises the threshold-based decider 112 and decides whether the baseband I and Q signals are valid or invalid by referring to the power computed by the power calculating unit and at least one threshold value. The signal interpolation unit comprises the signal interpolator 110, 110A, or 110B and implements interpolation with respect to the FM-detection-result signal generated by the detection-result signal generating unit in cases where the threshold-based deciding unit decides that the baseband I and Q signals are invalid. Preferably, the threshold-based deciding unit determines whether or not the computed power is in the range between two different threshold values (the normal range). When the computed power is not in the normal range, the threshold-based deciding unit decides that the baseband I and Q signals are invalid. Otherwise, the threshold-based deciding unit decides that the baseband I and Q signals are valid.

Thereby, in the case where an FM wave is subjected to bandwidth throttling or passed through a notch filter, or in the case where the FM wave is in noisy conditions, the FM detector 100 can reduce impulse noises superimposed on the FM wave.

In the case where the amplitude of an FM wave is decreased by a noise so that a corresponding impulse noise is superimposed on an FM-detection-result signal, the FM detector 100 can detect and reduce the impulse noise.

The FM detector 100 detects a pulse noise by comparing the power of baseband I and Q signals with the normal range rather than sensing the leading edge of the pulse noise. Thus, the FM detector 100 implements the pulse-noise-reducing signal interpolation on the FM-detection-result signal only for a short time necessary. Furthermore, the FM detector 100 reduces or minimizes a distortion of the FM-detection-result signal which is cased by the pulse noise.

The threshold-based decider 112 may be modified as follows. The modified threshold-based decider 112 calculates the average of the computed powers notified by the power calculator 111 for a prescribed number of successive 1-sample periods. The modified threshold-based decider 112 varies the threshold values "a" and "b" in accordance with the calculated power average. Therefore, the modified threshold-based decider 112 can compensate for a power fluctuation caused by, for example, a temperature variation. Thus, the decision by the modified threshold-based decider 112 remains correct and reliable even when a power fluctuation occurs.

The threshold-based decider 112 may implement the decision by using only one threshold value or three or more threshold values. According to a first example, the threshold-based decider 112 determines whether or not the power computed by the power calculator 111 is lower than a predetermined threshold value. When the power is lower than the threshold value, the threshold-based decider 112 concludes the current samples of the bandwidth-throttled baseband I and Q signals to be invalid. Otherwise, the threshold-based decider 112 concludes the current samples of the bandwidth-throttled baseband I and Q signals to be valid. According to a second example, the threshold-based decider 112 determines whether or not the power computed by the power calculator 111 is higher than a predetermined threshold value. When the power is higher than the threshold value, the threshold-based decider 112 concludes the current samples of the bandwidth-throttled baseband I and Q signals to be invalid. Otherwise, the threshold-based decider 112 concludes the current samples of the bandwidth-throttled baseband I and Q signals to be valid.

The hold-type signal interpolation and the linear signal interpolation may be selectively implemented as follows. In the case where the decision-result signal continues to indicate sample invalidness for longer than a prescribed number of successive 1-sample periods, the hold-type signal interpolation is implemented. On the other hand, in the case where the decision-result signal continues to indicate sample invalidness for only the prescribed number of successive 1-sample periods or shorter, the linear interpolation is implemented.

What is claimed is:

1. An FM (Frequency Modulation detector comprising:
    a quadrature detector for subjecting a received FM wave signal to quadrature detection to generate baseband I and Q signals;
    a phase converter for converting the baseband I and Q signals generated by the quadrature detector into a sequence of samples of phase information;
    a detection-result signal generator for generating an FM-detection-result signal in response to a variation between two successive samples of the phase information generated by the phase converter;
    a power calculator for computing a power of the baseband I and Q signals generated by the quadrature detector;
    a threshold-based decider for deciding whether the baseband I and Q signals are valid or invalid by referring to the power computed by the power calculator and at least one threshold value; and
    a signal interpolator for implementing signal interpolation with respect to the FM-detection-result signal generated by the detection-result signal generator in cases where the threshold-based decider decides that the baseband I and Q signals are invalid.

2. An FM detector as recited in claim 1, wherein the threshold-based decider determines whether or not the power computed by the power calculator is in a range between two different threshold values, and decides that the baseband I and Q signals are invalid when determining that the power is not in the range.

3. An FM detector as recited in claim 1, wherein the threshold-based decider determines whether or not the power computed by the power calculator is lower than the threshold value, and decides that the baseband I and Q signals are invalid when determining that the power is lower than the threshold value.

4. An FM detector as recited in claim 1, wherein the threshold-based decider determines whether or not the power computed by the power calculator is higher than the threshold value, and decides that the baseband I and Q signals are invalid when determining that the power is higher than the threshold value.

5. An FM detector as recited in claim 1, wherein the threshold-based decider calculates an average of the power computed by the power calculator, and varies the threshold value in accordance with the calculated average.

6. An FM detector as recited in claim 1, wherein the signal interpolator implements the signal interpolation by using the FM-detection-result signal originating from the baseband I and Q signals decided to be valid by the threshold-based decider which are the last ones preceding the baseband I and Q signals decided to be invalid by the threshold-based decider.

7. An FM detector as recited in claim 1, wherein the interpolation implemented by the signal interpolator is linear interpolation, and the signal interpolator implements the linear interpolation by using the FM-detection-result signal originating from the baseband I and Q signals decided to be valid by the threshold-based decider which are the last ones preceding the baseband I and Q signals decided to be invalid by the threshold-based decider and the FM-detection-result signal originating from the baseband I and Q signals decided to be valid by the threshold-based decider which are the first ones following the baseband I and Q signals decided to be invalid by the threshold-based decider.

8. An FM detector as recited in claim 1, wherein the threshold value is predetermined.

9. A method of signal interpolation, comprising the steps of:
- subjecting a received FM (Frequency Modulation broadcast signal to quadrature detection to generate baseband I and Q signals;
- converting the baseband I and Q signals into a sequence of samples of phase information;
- generating an FM-detection-result signal in response to a variation between two successive samples of the phase information;
- computing a power of the baseband I and Q signals;
- deciding whether the baseband I and Q signals are valid or invalid by referring to the computed power and at least one threshold value; and
- implementing signal interpolation with respect to the FM-detection-result signal in cases where it is decided that the baseband I and Q signals are invalid.

10. An apparatus comprising:
- a quadrature detection unit configured to subject a received FM (Frequency Modulation wave signal to quadrature detection to generate baseband I and Q signals;
- a phase converting unit configured to convert the baseband I and Q signals into a sequence of samples of phase information;
- a detection-result signal generating unit configured to generate an FM-detection-result signal in response to a variation between two successive samples of the phase information;
- a power calculating unit configured to compute a power of the baseband I and Q signals;
- a threshold-based deciding unit configured to decide whether the baseband I and Q signals are valid or invalid by referring to the power computed by the power calculating unit and at least one threshold value; and
- a signal interpolation unit configured to implement signal interpolation with respect to the FM-detection-result signal in cases where the threshold-based deciding unit decides that the baseband I and Q signals are invalid.

* * * * *